(12) United States Patent
Fujita

(10) Patent No.: US 9,372,653 B2
(45) Date of Patent: Jun. 21, 2016

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tadanobu Fujita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/636,394

(22) Filed: Mar. 3, 2015

(65) Prior Publication Data

US 2015/0254539 A1     Sep. 10, 2015

(30) Foreign Application Priority Data

Mar. 6, 2014  (JP) .................. 2014-044259

(51) Int. Cl.
*G06K 15/02* (2006.01)
*G06F 3/12* (2006.01)

(52) U.S. Cl.
CPC .............. *G06F 3/1285* (2013.01); *G06F 3/125* (2013.01); *G06F 3/1208* (2013.01)

(58) Field of Classification Search
None
See application file for complete search history.

(56) References Cited

U.S. PATENT DOCUMENTS

| | | | | |
|---|---|---|---|---|
| 6,832,352 B1 * | 12/2004 | Dooley | ............... | G06F 17/211 715/234 |
| 7,518,744 B2 * | 4/2009 | Komagamine | ....... | G06F 3/1204 358/1.13 |
| 7,551,310 B2 * | 6/2009 | Yudasaka | ............. | H04N 1/3875 358/1.18 |
| 8,233,184 B2 | 7/2012 | Yamaguchi et al. | | |
| 8,395,807 B2 * | 3/2013 | Yada | ................... | H04N 1/3875 358/1.18 |
| 8,477,362 B2 | 7/2013 | Fujita | | |
| 8,687,228 B2 | 4/2014 | Fujita | | |
| 2001/0043359 A1 * | 11/2001 | Mori | ..................... | G06K 15/02 358/1.15 |
| 2010/0245852 A1 * | 9/2010 | Fujita | ................... | G06F 3/1205 358/1.2 |
| 2013/0169978 A1 * | 7/2013 | Fujita | ................... | G06F 3/1205 358/1.2 |
| 2014/0092399 A1 * | 4/2014 | Sawada | ................ | G06F 3/1208 358/1.2 |
| 2014/0185062 A1 * | 7/2014 | Li | ...................... | G06K 15/1843 358/1.2 |

FOREIGN PATENT DOCUMENTS

JP     2010-231377 A     10/2010

* cited by examiner

*Primary Examiner* — Dung Tran
(74) *Attorney, Agent, or Firm* — Fitzpatrick, Cella, Harper & Scinto

(57) ABSTRACT

In an enlarged/reduced printout in which the document margin of an application setting is maintained, a margin considering the enlargement ratio or reduction ratio needs to be set again in the application at the time of printing. An information processing apparatus that executes the application performs the following process: a paper size and margin size for printing a document are designated. First paper information based on an original size and margin size set by the application, and second paper information based on the designated paper size and margin size, which are generated by executing a plug-in program for the application, are acquired. When printing a document to match the paper size, print data is enlarged or reduced based on the first paper information and the second paper information while the margin size set by the application is maintained.

20 Claims, 9 Drawing Sheets

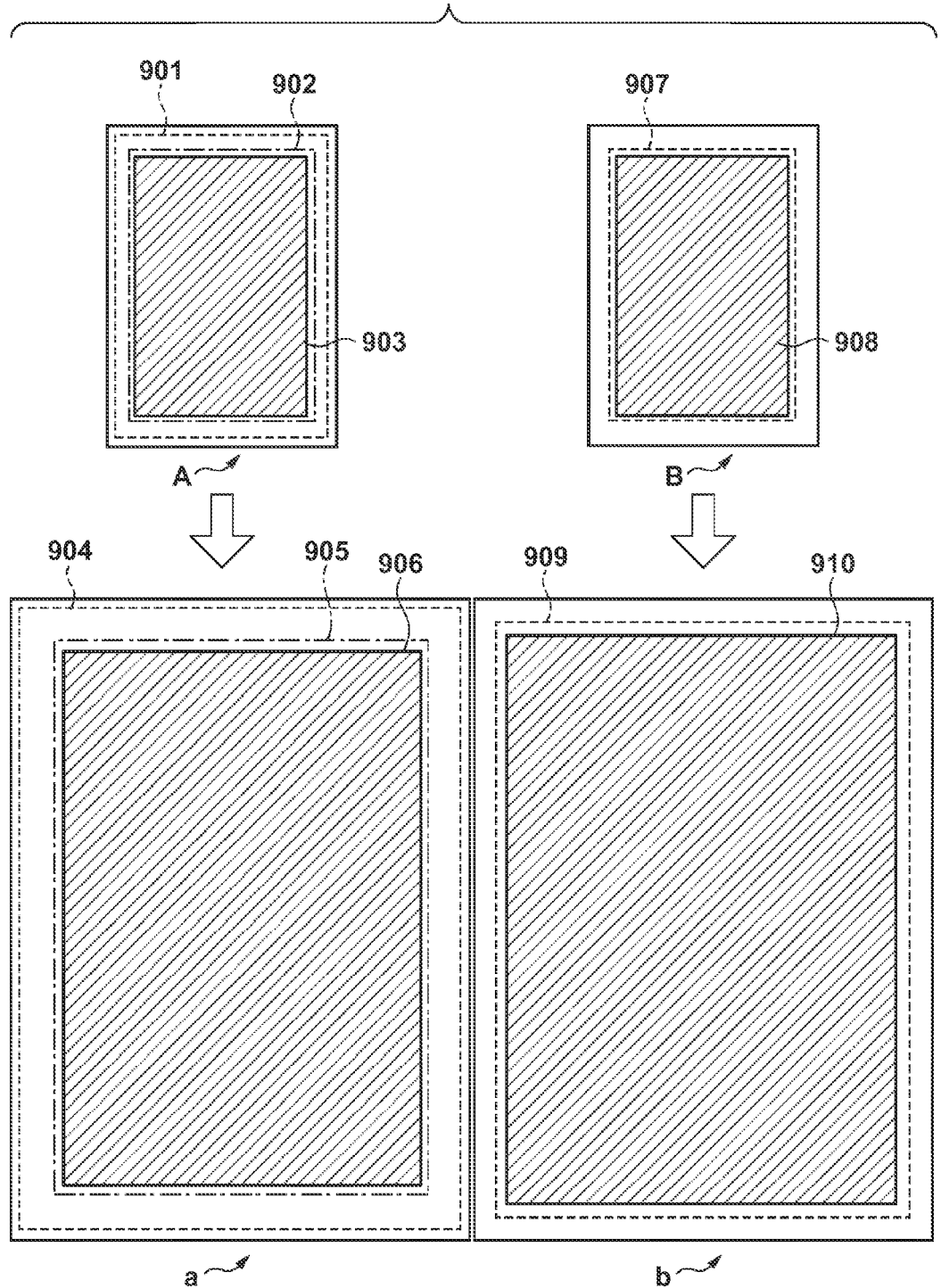

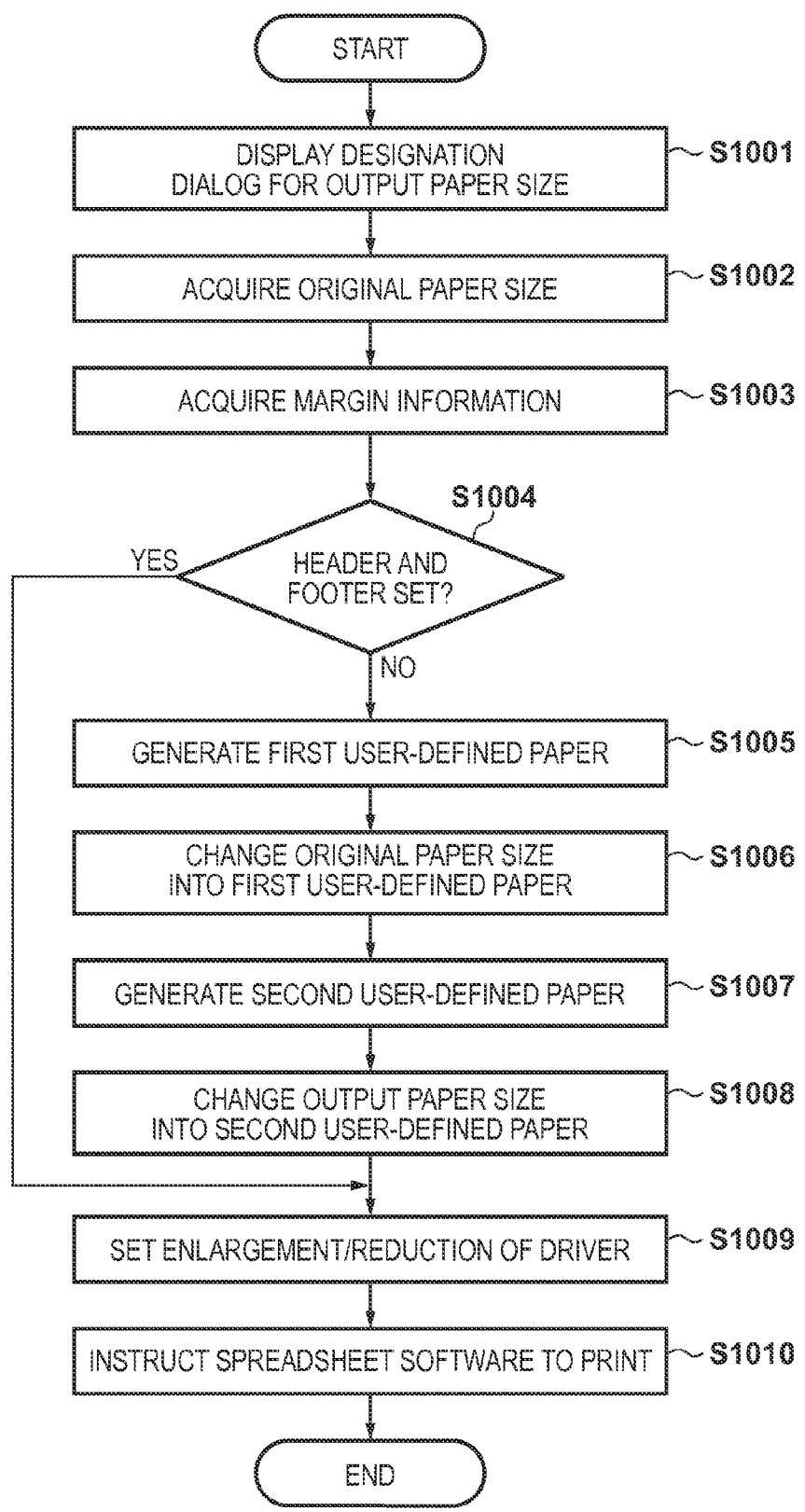

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus and information processing method for controlling resizing of a page in which data generated by an application is arranged, and to a storage medium.

2. Description of the Related Art

When an application installed in a personal computer or the like is executed to transfer image data having undergone editing, display, or the like to a printing apparatus and print, printing is sometimes performed via a printer driver corresponding to the printing apparatus. As a conventional printer driver function, there is an enlargement/reduction function of performing enlarged print or reduced print from an original paper size set in an application into an output paper size actually used for printing.

The enlargement/reduction function performs enlargement or reduction of image data generated by an application, based on the ratio of the effective printing areas of the original paper size and output paper size. Usable paper sizes in the enlargement/reduction function include not only standard sizes such as A4 and A3, but also user-defined paper sizes.

FIG. 11 is a view showing an example in which printing is performed by enlarging an original paper size to an output paper size using the enlargement/reduction function.

In such a case, especially when an image represented within the original paper size is small, even a margin area other than the printing area of the image is also enlarged or reduced, and the user may feel that the image to be printed becomes small more than necessary. For example, the margin of the effective printing area (surrounded by a broken line) increases upon enlargement, as shown in FIG. 11, and the user may think that the image (shaded area) can be enlarged some more.

There is a technique for solving this problem. Japanese Patent Laid-Open No. 2010-231377 describes updating of the margin setting of an application so as to apply a margin of an amount set in the application when a printer driver resizes a page generated by the application.

However, in the related art, a margin amount to be set in the application needs to be obtained from the resizing ratio of a page and set in the application.

SUMMARY OF THE INVENTION

Accordingly, the present invention is conceived as a response to the above-described disadvantages of the conventional art.

For example, an information processing apparatus, an information processing method, and a storage medium according to this invention are capable of setting a margin of an appropriate amount without obtaining the resizing ratio of a page.

According to one aspect of the present invention, there is provided an information processing apparatus comprising: a specifying unit configured to specify, as a physical margin that is out of a target of resizing, an amount of a margin set on a print sheet in a case where a page in which data generated by an application is arranged is resized and printed on the print sheet; a determining unit configured to determine a page including, as the physical margin, a margin of the amount specified by the specifying unit; and a control unit configured to perform control for resizing the page which has been determined by the determining unit and in which the data is arranged.

The invention is particularly advantageous since a margin of an appropriate amount can be set without obtaining the resizing ratio of a page.

Further features of the present invention will become apparent from the following description of exemplary embodiments (with reference to the attached drawings).

BRIEF DESCRIPTION OF THE DRAWINGS

FIG. 9 is a view showing a difference between printing according to the embodiment and printing according to the related art.

FIG. 10 is a flowchart showing the operation of a plug-in program.

DESCRIPTION OF THE EMBODIMENTS

Exemplary embodiments of the present invention will now be described in detail in accordance with the accompanying drawings.

Here, plug-in software (to be referred to as a plug-in hereinafter) of spreadsheet software will be exemplified, and a method of performing enlarged print while maintaining a margin set in spreadsheet software based on the operation of the plug-in will be explained.

The plug-in is a program of adding a function to an application. For example, Microsoft® Office (Microsoft Corporation, USA) lays open a means for upgrading the function of an application itself. Such applications can enhance their functions by registering plug-ins.

Figure 1:
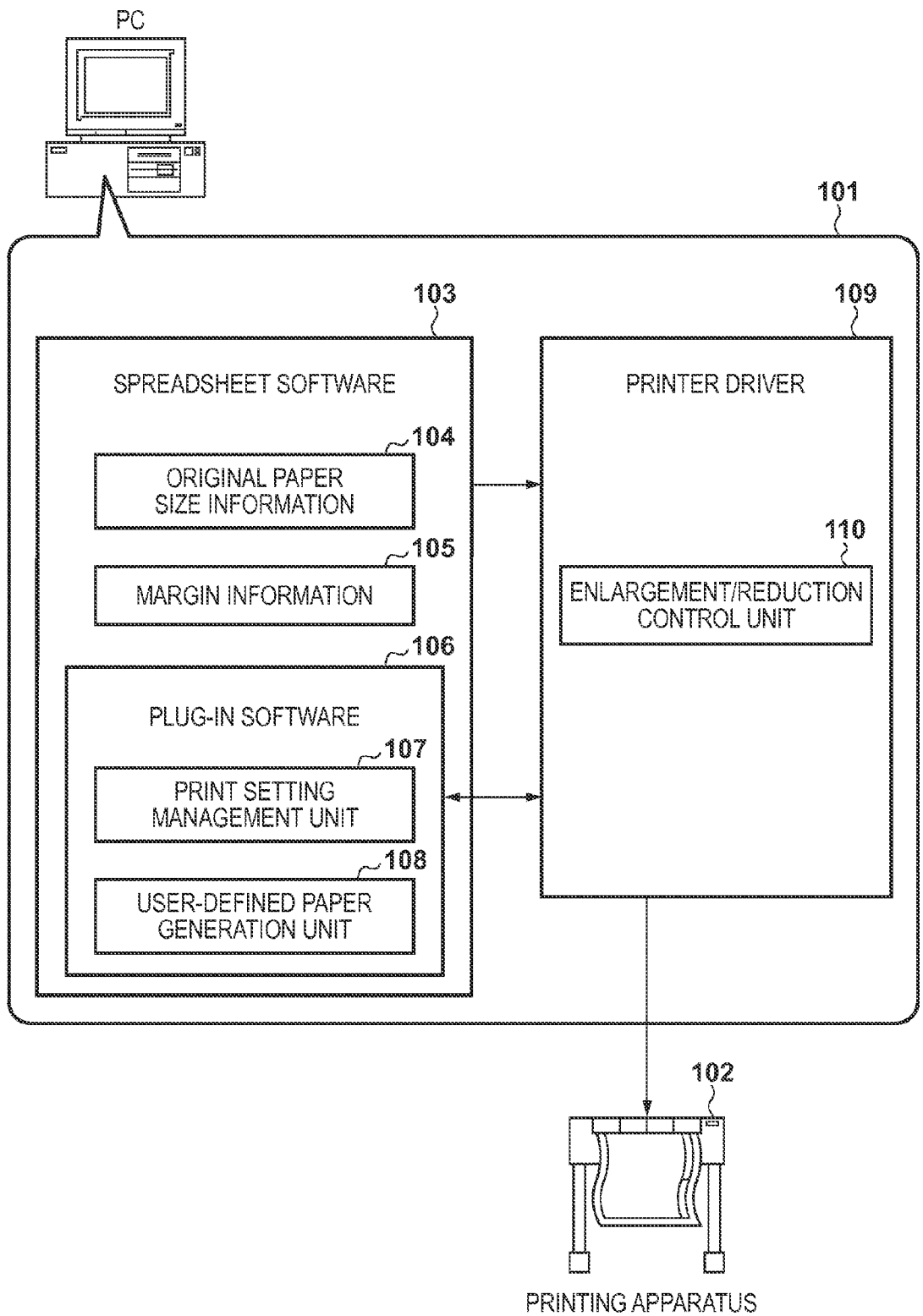
FIG. 1 is a block diagram showing the schematic arrangement of a system according to an embodiment.

FIG. 1 is a block diagram showing the arrangement of a system constituted by a PC (Personal Computer: information processing apparatus) 101 having a plug-in, and a printing apparatus 102 typified by a large-format printing apparatus according to an embodiment.

The PC 101 executes spreadsheet software 103, such as Microsoft Excel® (Microsoft Corporation, USA), which is general spreadsheet software. The spreadsheet software 103 provides an area where original paper size information 104 is set, and an area where margin information 105 is set. The spreadsheet software 103 includes plug-in software (plug-in) 106 that upgrades the function of the spreadsheet software. The plug-in 106 runs on the spreadsheet software 103, and operates in cooperation with a printer driver 109 that controls the spreadsheet software 103 and the printing apparatus 102.

The plug-in 106 includes a print setting management unit 107 including a print setting program (to be described later), and a user-defined paper generation unit 108. The user-defined paper generation unit 108 generates a user-defined paper size by using the function of an operating system (to be referred to as an OS hereinafter). The printer driver 109 interprets a print command received via the OS in order to request the printing apparatus 102 via the OS by the application to print, and generates print data interpretable by the printing apparatus 102. Also, the printer driver 109 accepts a change of print settings from the plug-in 106.

The printer driver 109 has the function of an enlargement/reduction control unit 110 that performs enlargement/reduction from an original paper size in an application to an output paper size actually used for printing.

Figure 2:
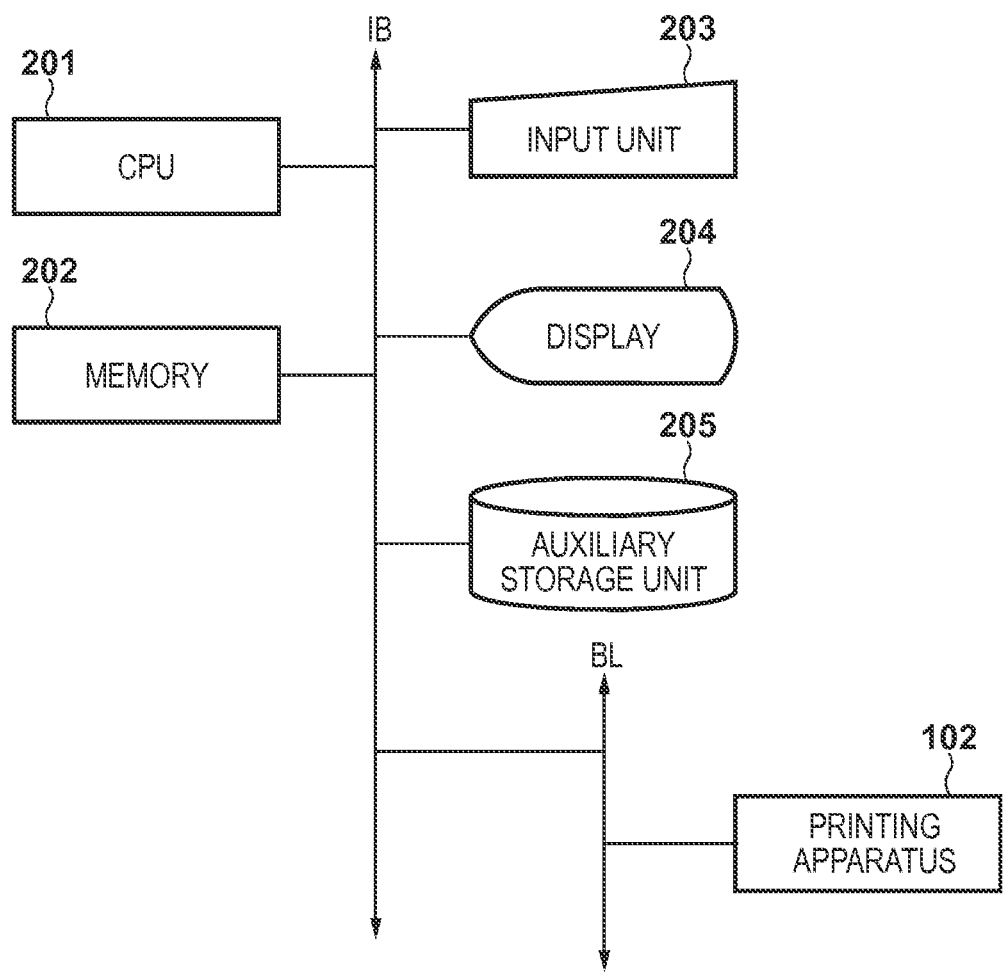
FIG. 2 is a block diagram showing the arrangement of a PC including plug-in software.

FIG. 2 is a block diagram showing the arrangement of the PC 101.

The PC 101 has a general arrangement, and includes a CPU 201, a memory 202 including a RAM and ROM, an input unit 203 including a keyboard, pointing device, and touch panel used to input information and instructions, and a display 204 such as a CRT or LCD. Further, the PC 101 includes an auxiliary storage unit 205 such as a hard disk or magneto-optical disk. These building components are connected by an internal bus IB. Note that the input unit 203, the display 204, and the auxiliary storage unit 205 may be incorporated in the PC 101, or may be external devices connected to the PC 101 via various interfaces.

The input unit 203 is used to perform various inputs and instructions from a user to icons, menus, and other objects displayed on the display 204 by the spreadsheet software 103 and the plug-in 106. The auxiliary storage unit 205 stores information of the plug-in 106, the spreadsheet software 103, the OS, and other programs. If necessary, these pieces of information are accessed from the CPU 201 and stored in the memory 202.

The internal bus IB of the PC 101 is connected to the printing apparatus 102 by an external bus BL, and a print job can be registered in the printing apparatus 102 from the PC 101.

Next, the operation of the plug-in 106 upon system registration in the spreadsheet software in the PC 101 having the above-described arrangement will be explained. At this time, assume that the plug-in 106 has been installed in the PC 101, as shown in FIG. 1.

Figure 3:
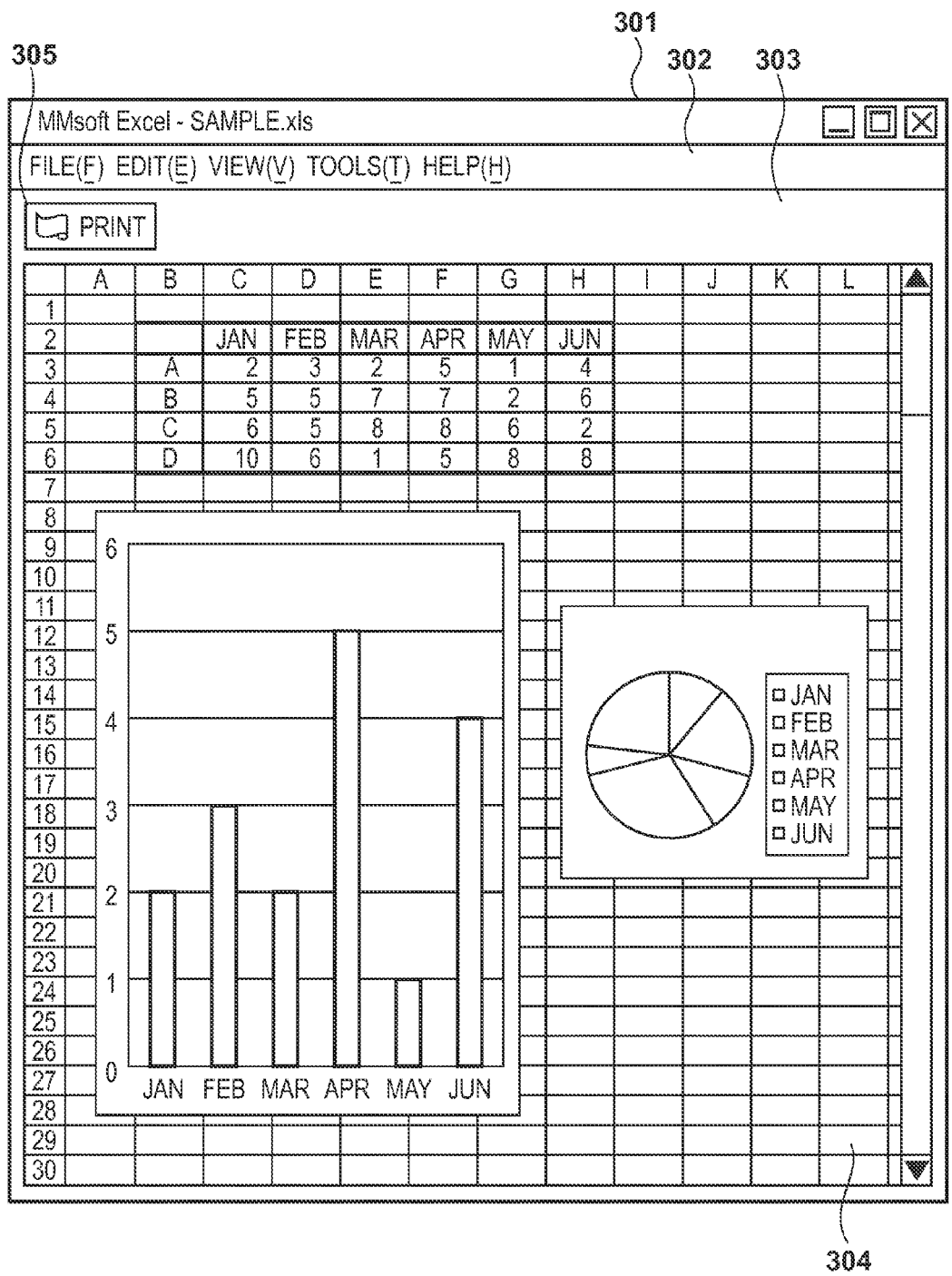
FIG. 3 is a view showing the initial screen of spreadsheet software.

FIG. 3 is a view showing the initial screen of the spreadsheet software 103.

As shown in FIG. 3, the initial screen of the spreadsheet software 103 roughly includes four parts: a title bar 301 that displays the title of a currently editing document or the like, a menu bar 302 that displays the functions of the spreadsheet software in a menu form, a tool bar 303 that displays the functions of the plug-in and spreadsheet software by icons, and a document display area 304 that displays a currently editing document.

In addition, when system registration of the plug-in 106 in the spreadsheet software 103 is performed, the tool bar 303 displays a plug-in print icon 305. Assume that the plug-in 106 has already been registered in the spreadsheet software 103. A description of the plug-in system registration method with respect to the spreadsheet software 103 will be omitted.

Figure 4:
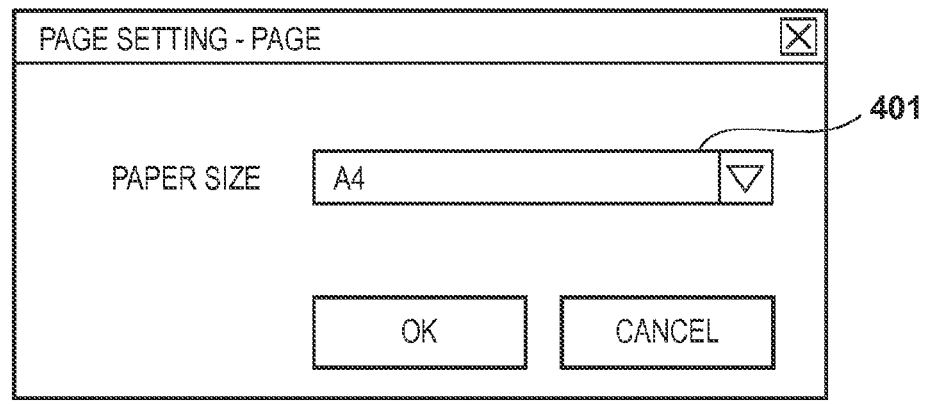
FIG. 4 is a view showing a setting screen used for setting an original paper size from the spreadsheet software.

FIG. 4 is a view showing a page setting screen used for setting a paper size from the spreadsheet software 103.

In FIG. 4, the paper size of an original to be generated by the spreadsheet software 103 is designated in a paper size combo box 401. The designated paper size is set in the area of the original paper size information 104 shown in FIG. 1. The print setting management unit 107 of the plug-in 106 can acquire the original paper size and change it into a user-defined paper size generated by the user-defined paper generation unit 108.

Figure 5:
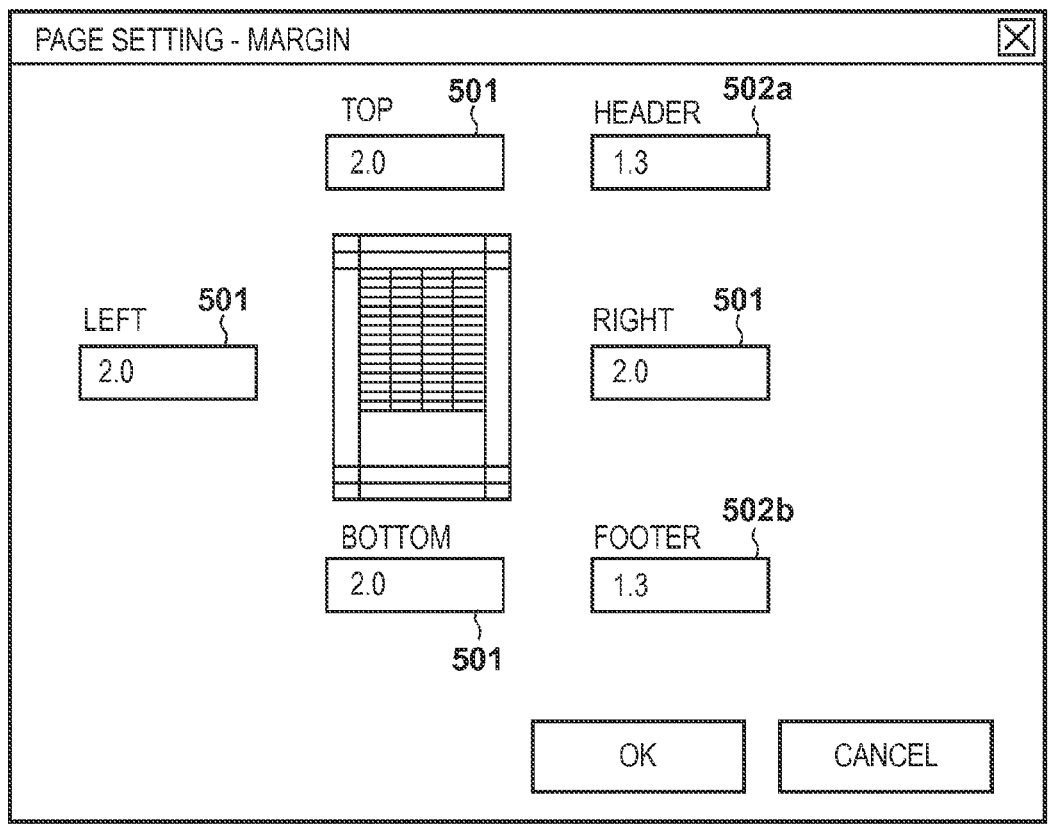
FIG. 5 is a view showing a setting screen used for setting the page margin of original paper from the spreadsheet software.

FIG. 5 is a view showing a page setting screen in which a page margin is set from the spreadsheet software 103.

Top, bottom, left, and right margin sizes for the original paper size are designated by centimeter (cm) in margin designation controls 501 shown in FIG. 5. A header position designation control 502a and a footer position designation control 502b designate the positions of a header and footer by centimeter (cm), respectively. Designated margin size values are set in the area of the margin information 105.

Figure 6:
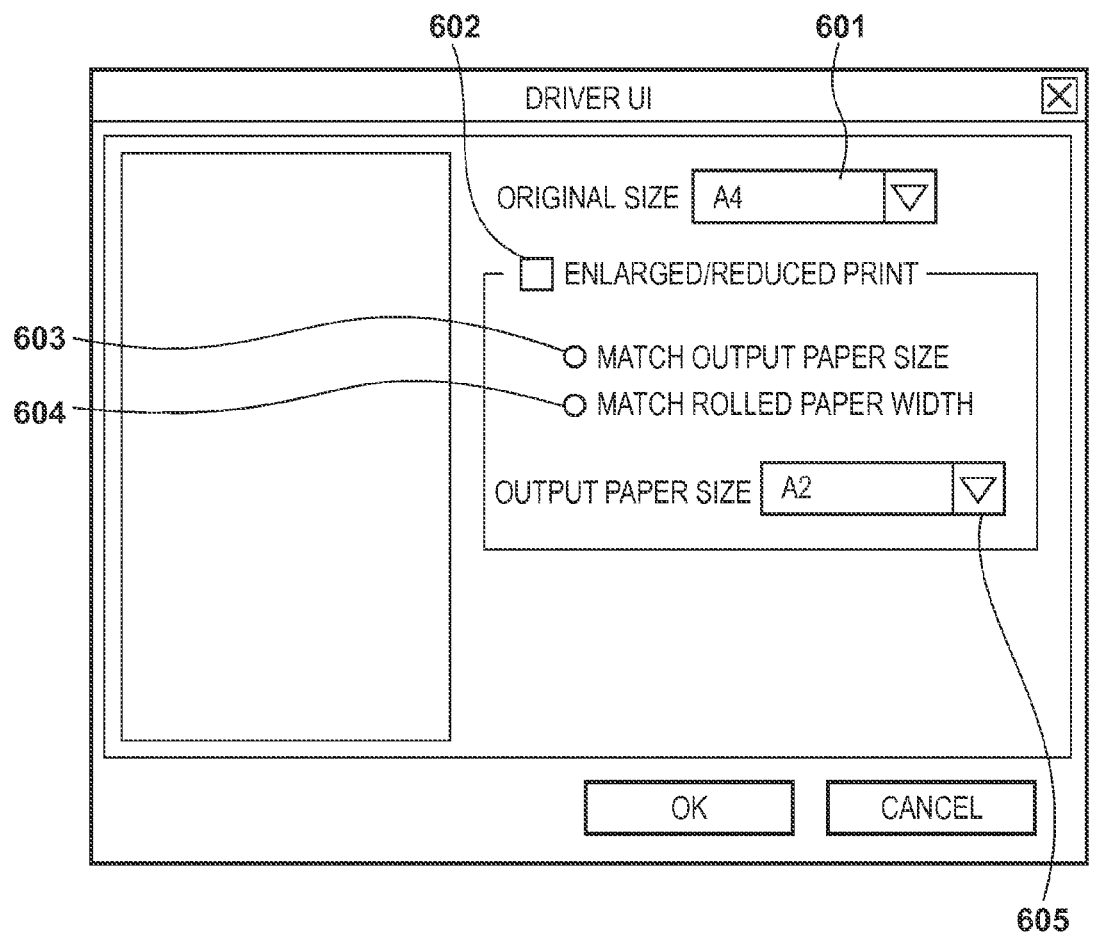
FIG. 6 is a view showing a screen used for making settings in the enlargement/reduction control facility of a printer driver.

FIG. 6 is a view showing a setting screen in the enlargement/reduction control unit 110 of the printer driver 109.

An original paper size generated by the spreadsheet software 103 is designated in an original size combo box 601 shown in FIG. 6. When an enlargement/reduction check box 602 is checked, one of various settings (to be described later) can be selected. Radio buttons 603 and 604 are used to select enlargement and reduction settings, and either setting is selectable. A paper size corresponding to a page to be output by the printing apparatus 102 is designated in an output paper size combo box 605.

When the radio button 603 for matching an output paper size is selected, the printer driver 109 can perform an enlargement/reduction process from a size designated in the original size combo box 601 to a size designated in the output paper size combo box 605. To the contrary, when the radio button 604 for matching a rolled paper width is selected, the printer driver 109 can automatically generate an output paper size from a width set in the original size combo box 601 so as to match a rolled paper width, and perform the enlargement/reduction process.

When an OK button shown in FIG. 6 is pressed in a state in which the radio button 603 or 604 is selected as described above, the printer driver 109 performs a resizing process corresponding to the selected radio button. More specifically, the printer driver 109 performs the resizing process on a page generated in the application, generates an image of a size after resizing, and causes the printing apparatus 102 to print the image.

The printer driver 109 can perform the above-mentioned resize setting and print control in accordance with a user instruction to the screen shown in FIG. 6. In this embodiment, not the user but the plug-in 106 performs the setting of the original size combo box 601, the resize setting instruction, and the print instruction, details of which will be described later.

Figure 7:
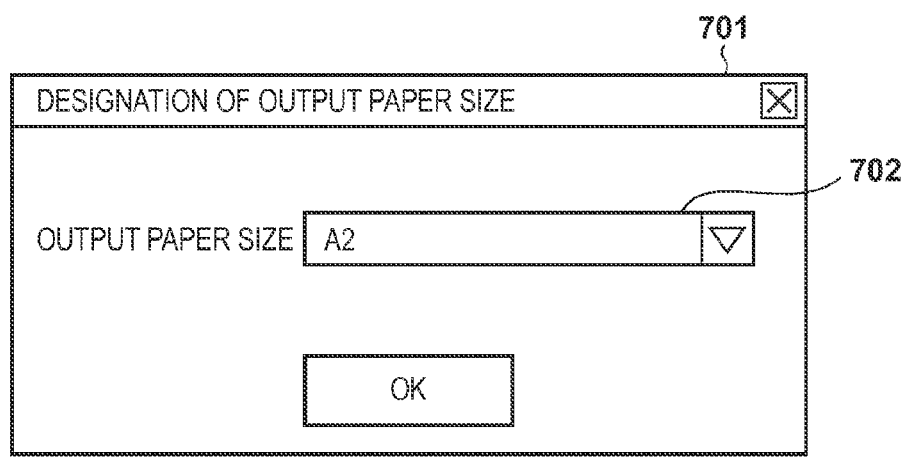
FIG. 7 is a view showing a dialog used for designating an output paper size from the plug-in software.

FIG. 7 is a view showing a designation dialog 701 for the output paper size that is displayed when the user presses the plug-in print icon 305. The designation dialog 701 is displayed on the display 204 when the CPU 201 executes the plug-in 106 and performs display control.

In the designation dialog 701, the user designates, as an output paper size, the size of a print sheet for printing data generated by the spreadsheet software 103. In the example shown in FIG. 7, A2 is designated as an output paper size in a combo box 702 for the size of an output medium (for example, output paper).

In the following description, a case in which the original paper size (page size set in FIG. 4) is A4 and the output paper size (paper size set by the user in FIG. 6) is A2 will be exemplified. Also, a case in which the radio button 603 for matching an output paper size is selected in the setting screen shown in FIG. 6 and the enlargement/reduction process (resizing process) is performed will be explained.

In this embodiment, a process for setting, in a page after resizing by the printer driver 109, a margin amount set in the spreadsheet software 103 in the page setting screen shown in FIG. 5 is performed. More specifically, a margin area (physical margin) out of the target of the resizing process within a page in the application is set in accordance with a margin amount set in the page setting screen. Then, a page having this physical margin is set as a page before resizing. This process will be explained with reference to FIGS. 8A to 10.

Figure 8A:
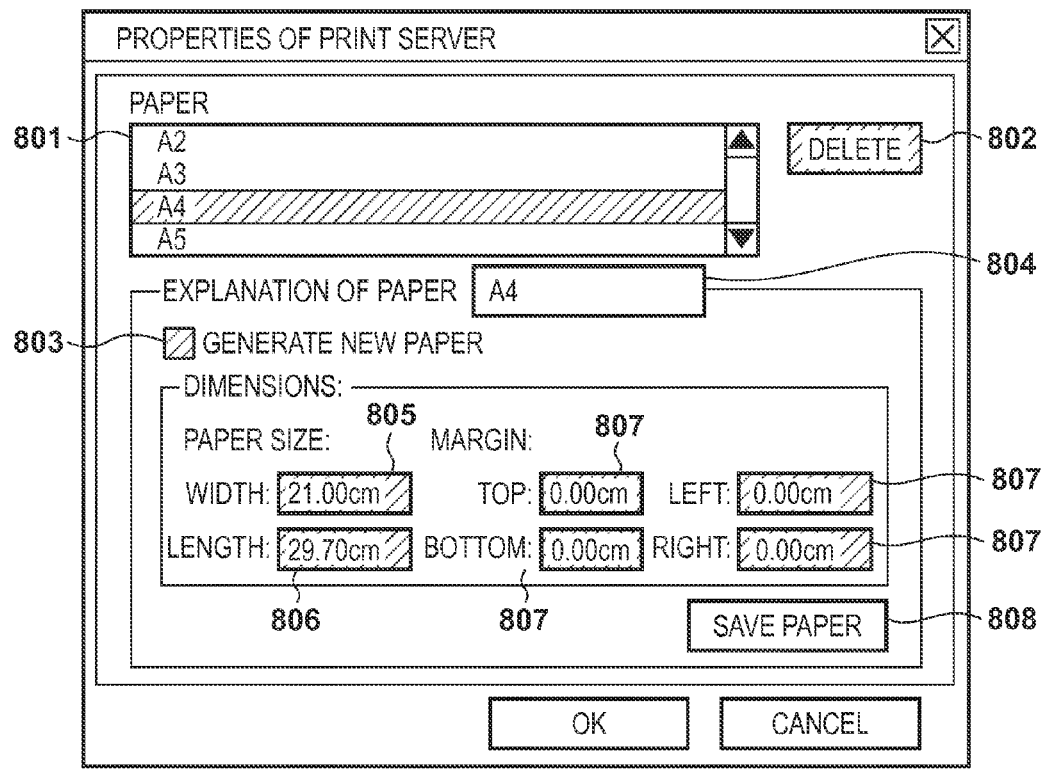
FIGS. 8A and 8B are views each showing a dialog for the properties of a print server that performs paper management.
Figure 8B:
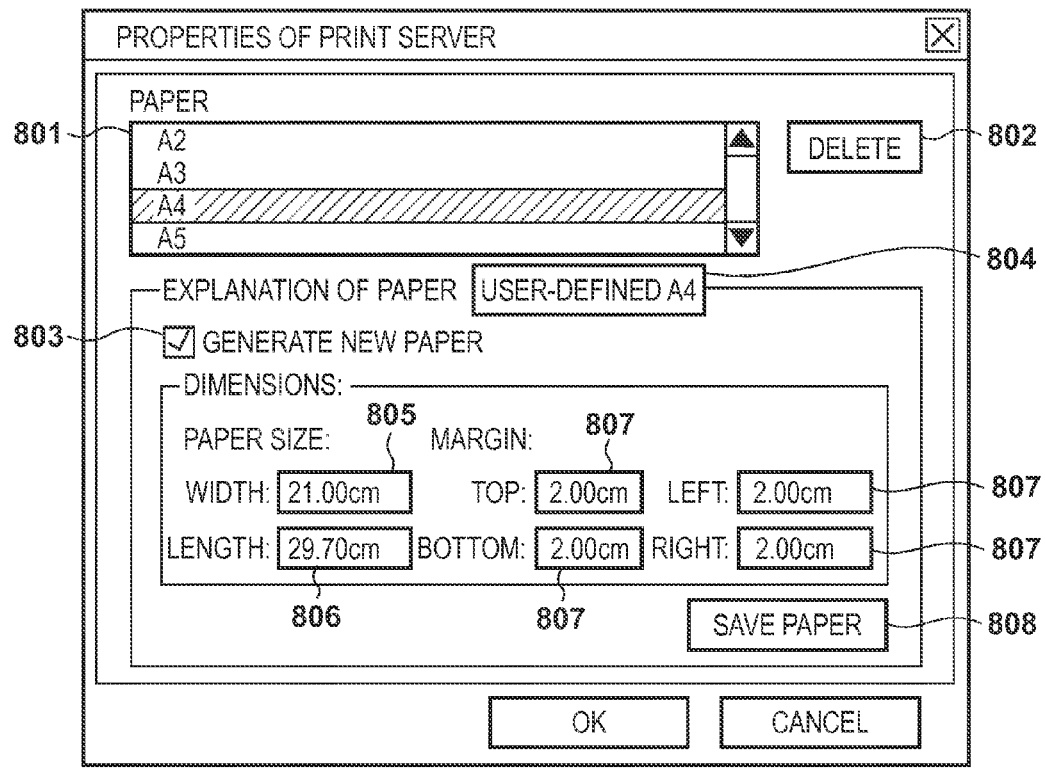
Figure 11:
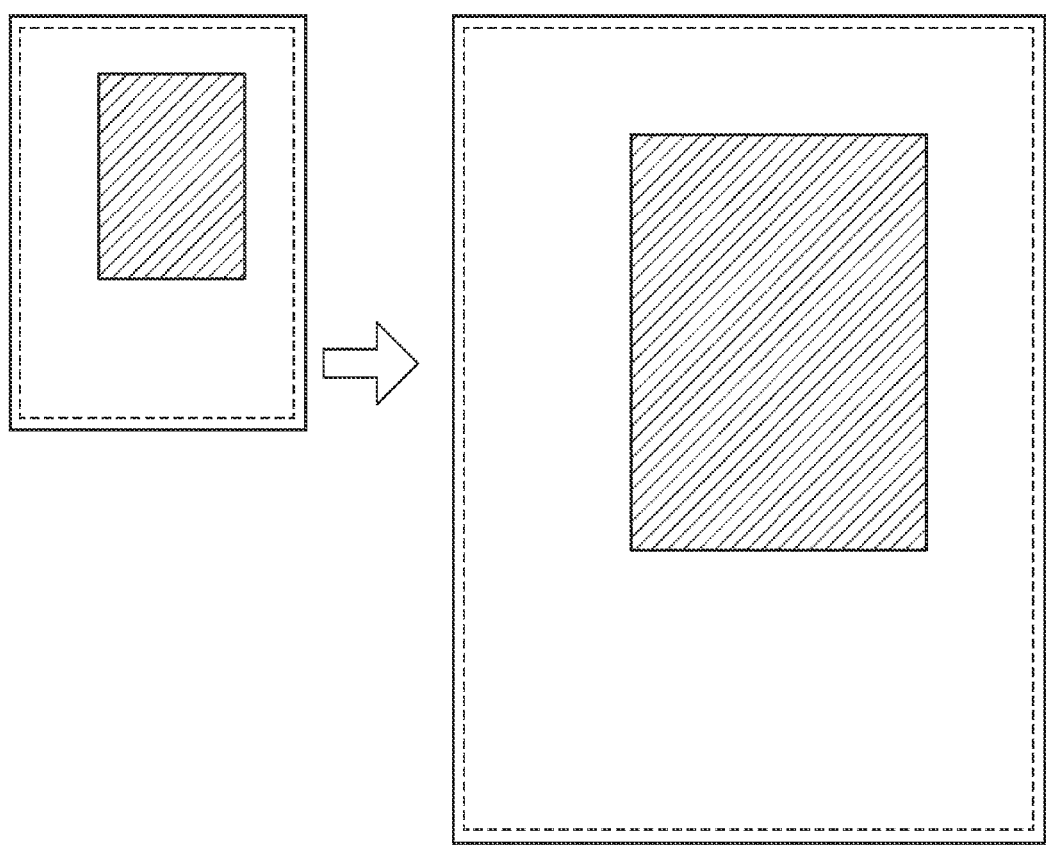
FIG. 11 is a view showing a state in which the margin becomes large upon enlarged print in the related art.

FIGS. 8A and 8B are views each showing a dialog for the properties of the print server of an OS that performs paper management. This example assumes Microsoft® Windows® (Microsoft Corporation, USA) is used as the OS. The user can display this dialog by using a user interface provided by the OS. This dialog displays the paper size of a print sheet that is managed by the OS, and the user can set the paper size and a margin (physical margin) on the paper.

FIG. 8A shows a screen for paper registered as a default in the OS. In this example, A4 is selected by a pointing device or the like as paper 801 registered in the OS. Such paper selection can be deleted in the case of user-defined paper registered by the user by clicking a paper delete button 802. There is a check box 803 for generating new paper by the user, and a paper name 804 is displayed. In this example, the check box 803 is not checked, so a paper name selected in the paper 801 is displayed. When the check box 803 is checked, the name of user-defined paper can be entered. This screen also displays a width 805 of the paper size, a length 806 of the paper size, and top, bottom, left, and right physical margins 807 of paper.

In FIG. 8A, the physical margin registered as a default in the OS is 0 cm even for A4 paper. Most printing apparatuses have physical margins such as 5 mm and 3 mm, except marginless print and the like. In this example, the physical margin size of the printing apparatus is 5 mm on the top, bottom, left, and right. The application receives effective printing area information from the printer driver 109 via the OS. When 0 cm is registered as the physical margin size of paper, it does not exceed the physical margin size of 5 mm in the printing apparatus 102. Thus, the printer driver 109 sends back, to the application, an effective printing area calculated from the physical margin of 5 mm.

When executing enlargement or reduction in the printer driver 109, enlargement/reduction is performed on an effective printing area excluding the top, bottom, left, and right physical margins each of 5 mm as long as the physical margin sizes of the original and output paper are 0 cm. These physical margins are set on an enlarged/reduced image. That is, the physical margin is out of the target of the resizing process by the printer driver 109.

When the user clicks a paper save button 808, information of new paper designated by the user on the dialog shown in FIGS. 8A and 8B is saved. In FIG. 8A, hatching of the display items 802, 803, 805, 806, 807, and 808 represents that neither setting nor change is possible.

FIG. 8B shows a screen for paper newly registered by the user. In this example, the width and length of A4 paper are 21 cm and 29.7 cm, respectively, which are a normal size, whereas user-defined paper having top, bottom, left, and right physical margin sizes each of 2 cm is generated. In a case where the physical margin of paper is set to be 2 cm, it exceeds the physical margin of 5 mm in the printing apparatus 102. Thus, the printer driver 109 sends back, to the application, an effective printing area calculated from the set physical margin of 2 cm. In a case where executing enlargement or reduction in the printer driver 109, enlargement or reduction is performed on an effective printing area excluding the top, bottom, left, and right physical margins each of 2 cm as long as the physical margins of the original and output paper are 2 cm. That is, the top, bottom, left, and right physical margins each of 2 cm for a page generated by the application are out of the target of the resizing process by the printer driver 109.

In this embodiment, the plug-in 106 sets such a physical margin in accordance with a margin amount set in the page setting screen. Then, a page having this physical margin is set as a page before resizing. This can prevent a margin amount (width) set in the page setting screen from becoming large owing to the resizing process by the printer driver 109.

FIG. 9 is a view showing a comparison between a process result obtained when the enlargement process according to this embodiment is performed and a process result obtained when the enlargement process according to the related art is performed. In FIG. 9, A of FIG. 9 and a of FIG. 9 on the left side represent pages having undergone the enlargement process according to the related art, and B of FIG. 9 and b of FIG. 9 on the right side represent pages having undergone the enlargement process according to this embodiment.

In FIG. 9, A represents original paper (page) set in the spreadsheet software 103. The original paper size is A4, which is registered in the OS, and the top, bottom, left, and right physical margin sizes of the registered paper each are 0 cm. This size is a size set in the dialog shown in FIG. 8A. An area outside a broken line in A of FIG. 9 is the area of the physical margin, and is 5 mm on the top, bottom, left, and right in A of FIG. 9.

An effective printing area 901 inside the broken line in A of FIG. 9 is an effective printing area representing A4 paper from which the physical margin of 5 mm in the printing apparatus 102 is excluded. This effective printing area is the target of resizing by the printer driver 109.

An application drawing region 902 is calculated from margins set in the spreadsheet software 103. In this page, the margins set in the spreadsheet software 103 (margins set in the screen of FIG. 5) include physical margins. In a case where the top, bottom, left, and right margins set in the spreadsheet software 103 each are 2 cm, the difference between the effective printing area 901 and the application drawing region 902 is 1.5 mm on the top, bottom, left, and right. An image 903 drawn based on data generated by the application is arranged inside the application drawing region 902.

In FIG. 9, a represents an output result in a case where the original paper size set by the application is enlarged to an output paper size of A2. Even for A2 paper, as for A4 paper, the top, bottom, left, and right physical margin sizes of the registered paper each are 0 cm. In FIG. 9, a represents an effective printing area 904 of A2 paper that is calculated from the physical margin of 5 mm in the printing apparatus 102, and an application drawing region 905 after enlargement to A2 paper. Further, an image 906 enlarged and drawn on A2 paper is arranged inside the application drawing region 905.

Since the effective printing area 904 is the target of the resizing process, as described above, the outside of the effective printing area 904 (outside the broken line in a of FIG. 9) maintains the top, bottom, left, and right margin amounts each of 5 mm as physical margins.

An additionally enlarged application margin will be explained.

In a case where enlarging A4 paper (210 mm wide and 297 mm long) to A2 paper (420 mm wide and 594 mm long), enlargement ratios in the breadthwise and lengthwise directions are as follows:

enlargement ratio in breadthwise direction =

(paper width after resizing − left physical margin − right physical margin)/(paper width before resizing − left physical margin − right physical margin)

enlargement ratio in lengthwise direction =

(paper length after resizing − top physical margin − bottom physical margin)/(paper length before resizing − top physical margin − bottom physical margin)

In the example of FIG. 9, the enlargement ratios in the breadthwise and lengthwise directions are as follows:

enlargement ratio in breadthwise direction =

(420 mm − 5 mm − 5 mm)/(210 mm − 5 mm − 5 mm) = 2.05 enlargement ratio in lengthwise direction =

(594 mm − 5 mm − 5 mm)/(297 mm − 5 mm − 5 mm) = 2.03

Since enlargement in this example is implemented by inscribed enlargement, the enlargement ratio is 2.03.

In a of FIG. 9, the margin area between the effective printing area 904 and the application drawing region 905 is as follows:

(margin width set in application−physical margin)× (page resizing ratio)

In this example, the margin area is as follows:

(application margin: 20 mm−physical margin: 5 mm)× (2.03)=30.45 mm

For example, in a case where a margin amount set in the application is to be maintained, an additionally enlarged application margin can be calculated as follows:

30.45 mm−(application margin: 20 mm−physical margin: 5 mm)=15.45 mm

As described above, in A of FIG. 9 and a of FIG. 9, for example, even though the user desires a margin amount set in the application, a margin different from the desired margin amount may be unintentionally set owing to the resizing process of the printer driver 109.

To solve this, according to this embodiment, the plug-in 106 performs a process of setting a physical margin amount in accordance with a margin amount set in the application so as to maintain the set margin amount even after resizing.

In FIG. 9, B represents the first user-defined paper generated from the outline size of A4 paper in the user-defined paper generation unit 108 of the plug-in 106. Information that defines the size of this paper will be referred to as the first paper information. In this example, the top, bottom, left, and right margin amounts each of 2 cm set in the setting screen of the spreadsheet software 103 shown in FIG. 5 are maintained even after resizing. As shown in FIG. 8B, the first user-defined paper is equal in width and length to A4 paper, and its top, bottom, left, and right physical margin sizes each are 2 cm. In FIG. 9, B represents an effective printing area 907 of the first user-defined paper that is calculated from the physical margin of the paper=2 cm, and an image 908 which has been drawn inside the effective printing area 907 based on drawing data by the application.

The plug-in 106 sets, as a physical margin, a width margin set in the margin setting of the application. Hence, the effective printing area 907 equals the application drawing region 902.

In FIG. 9, b represents the second user-defined paper generated from the outline size of A2 paper in the user-defined paper generation unit 108. As described above, the physical margin (2 cm on the top, bottom, left, and right) set in the first user-defined paper is out of the target of the resizing process by the printer driver 109. The second user-defined paper is equal in width and length to A2 paper, and its top, bottom, left, and right physical margin sizes each are 2 cm. Information that defines the size of this paper will be referred to as the second paper information. The second user-defined paper exhibits an effective printing area 909 calculated from the physical margin of the paper=2 cm, and an image 910 which has been enlarged and drawn on A2 paper.

In a case where a printout is enlarged from the first user-defined paper to the second user-defined paper, it is enlarged in the effective printing area from which margins set in the application are excluded, so the application margin is not enlarged, unlike a of FIG. 9. It can therefore be operated to enlarge an image while maintaining the margin of the spreadsheet software 103 that is set for original paper in the application.

As is apparent from a comparison between the left side of FIG. 9 and the right side of FIG. 9, although the original paper size is A4 and the output paper size is A2 in the two cases, an enlarged/drawn image on the right side of FIG. 9 is larger than an enlarged/drawn image on the left side of FIG. 9. For example, if the user desires, even after resizing, a margin amount set in the application, resizing can be performed while maintaining this margin amount. Consequently, when the enlargement process is performed, an image can be enlarged much more.

The detailed operation of the plug-in according to this embodiment will be explained with reference to a flowchart.

FIG. 10 is a flowchart showing a series of operations in the plug-in.

When the user clicks the plug-in print icon 305 displayed on the tool bar 303 of the spreadsheet software 103, the operation of the plug-in program starts.

First, in step S1001, the designation dialog 701 for the output paper size shown in FIG. 7 is displayed on the display 204, and the process waits for a user input. In the designation dialog 701 for the output paper size, the user designates the paper size of a print sheet to be printed. Assume that A2 paper is designated. If the user presses (clicks) the OK button, the process shifts to step S1002.

In step S1002, the print setting management unit 107 acquires the original paper size information 104 of the spreadsheet software 103. The original paper size information 104 represents a page size set in the spreadsheet software 103. In this case, assuming that A4 is designated, as shown in FIG. 4, A4 paper is acquired. In step S1003, the print setting management unit 107 acquires the margin information 105 of the spreadsheet software 103. An amount indicated by the margin information 105 is specified as a margin amount set when printing a page in which data generated by the spreadsheet software 103 is arranged. Assuming that top, bottom, left, and right margins each of 2 cm are designated, as shown in FIG. 5, this value is specified. Setting information of the header and footer is also acquired in the same way.

In step S1004, it is checked whether a header and footer have been set. If it is determined that a header and footer have been set, the process advances to step S1009. If it is determined that neither header nor footer has been set, the process advances to step S1005.

In step S1005, the user-defined paper generation unit 108 generates the first user-defined paper from the original paper size information 104 and the margin information 105. More specifically, a margin width represented by the margin information 105 acquired in step S1003 is set as the width of the physical margin. The plug-in 106 determines, as a new A4 size, the physical margin and a paper size represented by the original paper size information 104 acquired in step S1002, and registers them in the OS. As described with reference to FIG. 8B, user-defined paper that is equal in width and length to A4 paper and has top, bottom, left, and right physical margin sizes each of 2 cm is generated as the first user-defined paper.

In step S1006, the print setting management unit 107 changes the original paper size information 104 of the spreadsheet software 103 into information of the first user-defined paper generated in step S1005. In step S1007, the user-defined paper generation unit 108 generates the second user-defined paper from the output paper size information acquired in step S1001, and the margin information 105. More specifically, a paper size represented by the output paper size information, and a margin amount represented by the margin information 105 (this margin amount is a physical margin amount and has been set in the application in step S1006) are registered in the OS. In this example, user-defined paper that is equal in width and length to A2 paper and has top, bottom, left, and right physical margin sizes each of 2 cm is generated as the second user-defined paper. In step S1008, the output paper size of the printer driver 109 is changed into the second user-defined paper generated in step S1007. By this process, the printer driver 109 sets the second user-defined paper as a predetermined size after page resizing.

In step S1009, the print setting management unit 107 performs the enlargement/reduction setting in response to selection of the radio button 603 for matching output paper with respect to the printer driver 109. In step S1010, the plug-in program executes a print instruction to instruct the spreadsheet software 103 to print with the current settings. After that, a series of processes end. Note that this print instruction may be issued not to the spreadsheet software 103 but to the printer driver 109.

In a case where a header and footer are set in the application, if the first user-defined paper is set in step S1005, information of the header and footer may not be printed. For this reason, if it is determined in step S1004 that the header and footer are set, the processes in steps S1005 to S1008 are skipped.

Note that enlarged print has been exemplified as the resizing process in the above description, but this embodiment is similarly applicable to even reduced print as the resizing process.

According to the above-described embodiment, the plug-in gives, to the spreadsheet software, an instruction reflecting enlarged (reduced) print, the spreadsheet software sends this instruction to the printer driver, and a printed product as represented in b of FIG. 9 can be obtained from the printing apparatus. As is apparent from a comparison between the left and right sides of FIG. 9, according to this embodiment, the printer driver 109 can perform the page resizing process while maintaining a margin width set in the application. The user can set appropriate user-defined paper for maintaining a margin width in the above-described way, without performing an operation on the screen as in FIGS. 8A and 8B. Further, according to this embodiment, a margin width set in the application is set as a physical margin regardless of the enlargement ratio or reduction ratio, and the margin amount of a page can be maintained before and after resizing.

Hence, a margin considering the enlargement ratio or reduction ratio need not be set again in the application at the time of printing, and a margin set in the application can be maintained. Since no resizing ratio need be taken into account, an appropriate page can be determined as a page before resizing without considering a page size after resizing. This also contributes to improvement of user operability.

In the above-described embodiment, user-defined paper sheets are registered in the OS in steps S1005 and S1008, and user-defined paper sheets are set in the application and the printer driver in steps S1006 and S1009, respectively. Upon completion of a print instruction in step S1010 of FIG. 10, the plug-in software may perform a process of deleting the user-defined paper sheets registered in the OS, and returning the user-defined paper sheets set in the application and the printer driver to original settings. This can prevent addition of user-defined paper without the intention of the user, and also prevent change of paper settings in the application and the printer driver.

Although addition of user-defined paper to the OS, and setting to the application are performed in steps S1005 and S1006, the present invention is not limited to this. For example, in step S1005, the physical margin in the paper definition of the OS shown in FIGS. 8A and 8B may be changed for an original paper size (for example, A4) acquired in step S1002. After the end of the process in FIG. 10, the plug-in software may return the physical margin to an original physical margin (for example, 0 mm). In this case, the paper size set in the application suffices to maintain the original size (for example, A4), so setting of the paper size in the application in step S1006 may be skipped. The advantages of the embodiment can be obtained without making settings to the application by the plug-in software.

In the above-described embodiment, a margin amount set in the application is acquired in step S1003 as a margin amount set in printing. However, the present invention is not limited to this, and the plug-in software may display in step S1002 a screen for designating a margin width, and acquire a margin width designated by the user in the screen.

In the above-described embodiment, the first user-defined paper and second user-defined paper each including a physical margin of an amount specified from the margin setting of the application are generated. However, the present invention is not limited to this, and a page from which the physical margin is excluded may be set as the original paper size of the application. More specifically, all the top, bottom, left, and right margin settings in the application are set to be 0 mm, and a page having only the application drawing region 905 in FIG. 9 is set.

In this case, a size obtained by excluding the physical margin from a paper size at which printing is performed is set as the output paper size in the printer driver. If resizing and printing by the printer driver are performed in this state, the physical margin is arranged for the application drawing region 905 after resizing at the paper size at which printing is performed. The print result represented in b of FIG. 9 can therefore be obtained.

The above-described embodiment has exemplified Microsoft® Excel® (Microsoft Corporation, USA) as an example of the application. However, the present invention is not limited to this and is applicable to even various spreadsheet software programs. Further, the present invention is not limited to spreadsheet software. The present invention may be applied to various applications that generate a page, including a document application including such as Microsoft® Word (Microsoft Corporation, USA), and Microsoft® PowerPoint® (Microsoft Corporation, USA).

Further, the above-described embodiment has described an example in which plug-in software other than the application and the printer driver operates. However, the present invention is not limited to this. For example, an application or a printer driver itself may implement the function of the plug-in software according to the embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-044259, filed Mar. 6, 2014, which is hereby incorporated by reference herein in its entirety.

What is claimed is:

1. An information processing apparatus comprising:
an inputting unit configured to input margin information corresponding to a margin amount which is arranged in a page including data generated by an application, the margin amount being changed in a case where the page is resized;
a first setting unit configured to set a first user-defined paper which has a size of the page and which includes a first effective printing area and a physical margin of the margin amount corresponding to the margin information input by the inputting unit, the first effective printing area being a target of resizing, and the physical margin being out of the target of resizing;
a second setting unit configured to set a second user-defined paper which has a size designated by a user and which includes a second effective printing area and the physical margin;

processing unit configured to perform control for resizing a page of the first user-defined paper set by the first setting unit, including the data in the first effective printing area, in accordance with the second user-defined paper set by the second setting unit.

2. The apparatus according to claim 1, wherein said processing unit performs control for causing a printer driver, which is configured to resize the page to the size of the second user-defined paper, to perform the resizing.

3. The apparatus according to claim 2, further comprising a display control unit configured to display, on a display apparatus, a screen used for designating a size of the page after resizing,
wherein the size of the second user-defined paper is a size which is designated in accordance with a user instruction to the screen displayed by said display control unit.

4. The apparatus according to claim 2, wherein said second setting unit sets the second user-defined paper in an output paper size of the printer driver.

5. The apparatus according to claim 1, wherein said first setting unit sets the first user-defined paper in a paper setting of the application.

6. The apparatus according to claim 5, wherein said first setting unit sets the first user-defined paper in the paper setting of the application by registering the first user-defined paper in an OS (Operating System) configured to manage a paper size.

7. The apparatus according to claim 6, wherein said processing unit performs print control for causing a printing apparatus to print the page, in addition to resizing of the page.

8. The apparatus according to claim 7, wherein in response to completion of the print control, said processing unit further returns the paper setting of the application to a setting before the setting of the first user-defined paper.

9. The apparatus according to claim 7, wherein said processing unit performs, as the print control, a print instruction to the application.

10. An information processing method comprising:
inputting margin information corresponding to a margin amount which is arranged in a page including data generated by an application, the margin amount being changed in a case where the page is resized;
setting a first user-defined paper which has a size of the page and which includes a first effective printing area and a physical margin of the margin amount corresponding to the input margin information, the first effective printing area being a target of resizing, and the physical margin being out of the target of resizing;
setting a second user-defined paper which has a size designated by a user and which includes a second effective printing area and the physical margin; and
performing control for resizing a page of the set first user-defined paper, including the data in the first effective printing area, in accordance with the set second user-defined paper.

11. The method according to claim 10, wherein in the performing control, control is performed for causing a printer driver, which is configured to resize the page to the size of the second user-defined paper, to perform the resizing.

12. The method according to claim 11, further comprising displaying, on a display apparatus, a screen used for designating a size of the page after resizing,
wherein the size of the second user-defined paper is a size which is designated in accordance with a user instruction to the screen displayed on the display apparatus.

13. The method according to claim 11, wherein the second user-defined paper is set in an output paper size of the printer driver.

14. The method according to claim 13, wherein the second user-defined paper is set in the output paper size of the printer driver by registering the second user-defined paper in an OS (Operating System) configured to manage a paper size.

15. The method according to claim 10, wherein in the first setting, the first user-defined paper is set in a paper setting of the application.

16. The method according to claim 15, wherein in the first setting, the first user-defined paper is set in the paper setting of the application by registering the first user-defined paper in an OS (Operating System) configured to manage a paper size.

17. The method according to claim 16, wherein in the performing control, print control for causing a printing apparatus to print the page is performed in addition to resizing of the page.

18. The method according to claim 17, wherein in the performing control, in response to completion of the print control, the paper setting of the application is returned to a setting before the setting of the first user-defined paper.

19. The method according to claim 17, wherein in the performing control, a print instruction to the application is performed as the print control.

20. A non-transitory computer readable storage medium which stores a computer program to be executed in a processor of an information processing apparatus, the program comprising:

inputting margin information corresponding to a margin amount which is arranged in a page including data generated by an application, the margin amount being changed in a case where the page is resized;

setting a first user-defined paper which has a size of the page and which includes a first effective printing area and a physical margin of the margin amount corresponding to the input margin information, the first effective printing area being a target of resizing, and the physical margin being out of the target of resizing;

setting a second user-defined paper which has a size designated by a user and which includes a second effective printing area and the physical margin; and performing control for resizing a page of the set first user-defined paper, including the data in the first effective printing area, in accordance with the set second user-defined paper.

* * * * *